United States Patent
Ross et al.

(10) Patent No.: US 6,754,282 B1
(45) Date of Patent: Jun. 22, 2004

(54) DC-FREE RUN LENGTH CONSTRAINED LINE CODING WITH CHANNEL GAIN

(75) Inventors: John Anderson Fergus Ross, Del Mar, CA (US); Gary Jude Saulnier, Rexford, NY (US); Eugene Joseph Orlowski, Scotia, NY (US); Richard Louis Frey, Delanson, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/460,106

(22) Filed: Dec. 13, 1999

(51) Int. Cl.⁷ ................................................. H04L 23/00
(52) U.S. Cl. .................... 375/265; 375/240.22; 375/253
(58) Field of Search ........................... 375/240.22, 265, 375/253

(56) References Cited

U.S. PATENT DOCUMENTS 6,385,255 B1 * 5/2002 McLaughlin et al. ....... 375/263

OTHER PUBLICATIONS

A. Viterbi, "CDMA: Principles of Spread Spectrum Communication", Library of Congress Cataloging–in–Publication Data.

I. Korn, "Digital Communications", Chapter 12, Van Nostrand Reinhold, NY.

A. R. Calderbank, et al., "Baseband Trellis Codes with a Spectral Null at Zero", IEEE Transactions on Information Theory, vol. 34, No. 3, May 1988.

G. Ungerboeck, "Channel Coding with Multilevel/Phase Signals", IEEE Transactions on Information Theory, vol. IT–28, No. 1, Jan. 1982.

A. Viterbi, "Error Bounds for Convolutional Codes and an Asymptotically Optimum Decoding Algorithm", IEEE Transactions on Information Theory, vol. IT–13, No. 2, Apr. 1967.

* cited by examiner

*Primary Examiner*—Mohammad H. Ghayour
*Assistant Examiner*—Pankaj Kumar

(57) ABSTRACT

A dc-free coding scheme that also provides channel gain employs a code that is based on an alphabet of two and comprises a list of N-dimensional vectors, where N is even, with a maximum run of two symbols. From this list, all vectors which begin or end in two identical symbols are eliminated. This avoids runs of longer than two consecutive symbols when vectors are concatenated. With this scheme, if the baseband transmission of a "+" is realized with positive voltage V and transmission of a "−" is realized with a negative voltage −V, then any concatenation of symbols is dc-free. Improved coding gain is realized by mapping modulated signals onto convolutional code trellises.

5 Claims, 5 Drawing Sheets

No. of balanced vectors with max run of 2 = 6

No. of balanced vectors with max run of 2 = 14

No. of balanced vectors with max run of 2 = 34

DC-FREE RUN LENGTH CONSTRAINED LINE CODING WITH CHANNEL GAIN

BACKGROUND OF THE INVENTION

This invention relates to coding methods and, more particularly, to a dc-tree coding method which also provides channel gain.

Spread spectrum radio systems employ a coding technique wherein a transmitter modulates data to be transmitted over a radio frequency (RF) link with a spreading code. In order to recover the data, the receiver must inverse-spread the received signal by using the same spreading code as used by the transmitter. Spreading codes comprise strings of bits known as "chips" which are multiplied with the data bits prior to transmission. Various spreading codes are known. Ideally, a spreading code should be balanced; that is, the occurrence of a positive chip "+1" is substantially equal in magnitude to that of a negative chip "−1". If the spreading code is not balanced, the received signal will include a direct current (DC) offset component having an amplitude corresponding to the imbalance.

A recently developed spread spectrum radio system minimizes RF component costs but requires dc-free baseband signaling with frequent polarity changes. This problem is similar to that found in previous magnetic recording and certain telecommunications systems and is solved with a method known as line coding.

The modulator for such spread spectrum radio system must generate two carriers with a frequency difference determined by channel parameters. One carrier is modulated with an FSK signal (frequency shift key) and spread while the other is just spread. The absolute accuracy of the carrier frequencies is not critical to system operation but the frequency difference is.

One low cost implementation is to use two frequency synthesizers and phase-locked-loops driven by a low stability reference oscillator. The FSK modulation is applied to one of the phase-locked loops at the voltage controlled oscillator (VCO). Frequency components of this modulation that are within the loop filter bandwidth become part of the VCO control voltage and are nulled out. Consecutive strings of ones or zeros in the data field appear to droop when observed at the demodulator. Since both phased-locked loops share the reference oscillator, applying the low frequency components of the modulation to the reference oscillator signal as is done in classical synthesizer design requiring dc response is not applicable.

It has been demonstrated in the lab that Manchester coding circumvents the problem by restricting sign changes to no longer than one bit period. A disadvantage of Manchester coding is that the bandwidth required to transmit the baseband signal is doubled. This is acceptable since low data rates are expected and spectrum spreading is necessary for compliance with the U.S. Federal Communications Commission (FCC) rules. Nevertheless, if one is prepared to double the bandwidth, there may be another method which has the advantages of Manchester coding but also provides coding gain that will allow the system to operate with less transmit power, or, alternatively, allow the radio system to communicate over a greater range.

Methods have recently been published which offer dc free signaling and coding gain. Unfortunately, these were designed for higher order modulations or complicated code structures which are not applicable to the low cost transceiver of interest here.

It would therefore be advantageous to provide a dc-free coding scheme having channel gain.

SUMMARY OF THE INVENTION

In a preferred embodiment the invention, all N-dimensional vectors based on an alphabet of two symbols, where N is even, and with a maximum run of two symbols, are derived. That is, a list of all of the N-dimensional vectors where no more than two like symbols ever appear consecutively is derived. From this list, all vectors that begin or end in two identical symbols are eliminated. This avoids runs of longer than two consecutive symbols when vectors are concatenated. With this scheme, if the baseband transmission of a "+" symbol is realized with positive voltage V and transmission of a "−" symbol is realized with a negative voltage −V, then any concatenation of symbols is dc-free. Improved coding gain is realized by mapping modulated signals onto convolutional code trellises.

DETAILED DESCRIPTION OF THE INVENTION

Examination of signal levels in the laboratory has shown that severe signal droop occurs if four identical symbols in a row are encountered. The droop is still noticeable at three in a row but barely noticeable at two in a row. Thus the codes presented are designed for a maximum run of two symbols of either sign. In a first step, a computer is utilized to produce a listed output of all N-dimensional vectors based on an alphabet of two symbols, where N is even, with a maximum run of two symbols.

Figure 1:
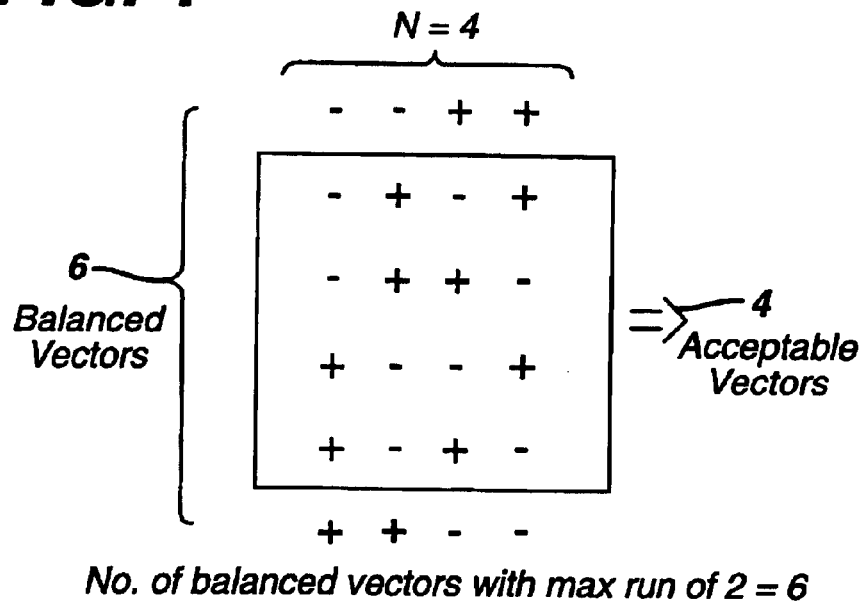
FIG. 1 is a list of the number of balanced vectors for N=4 with a maximum run of two.
Figure 2:
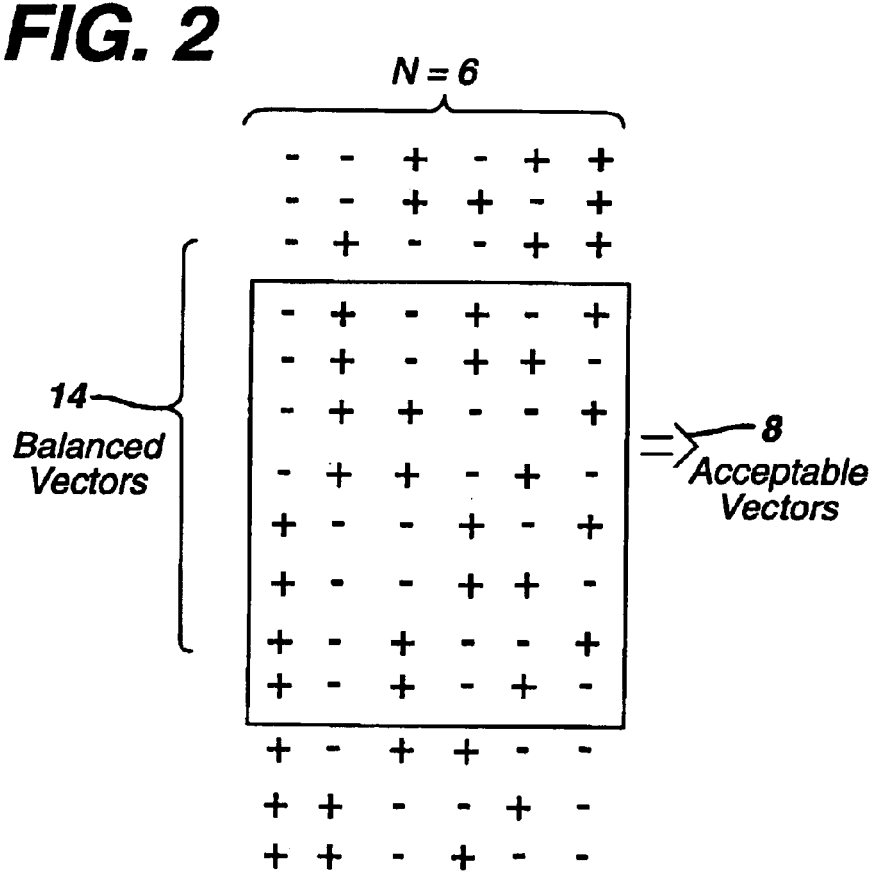
FIG. 2 is a list of the number of balanced vectors for N=6 with a maximum run of two.
Figure 3:
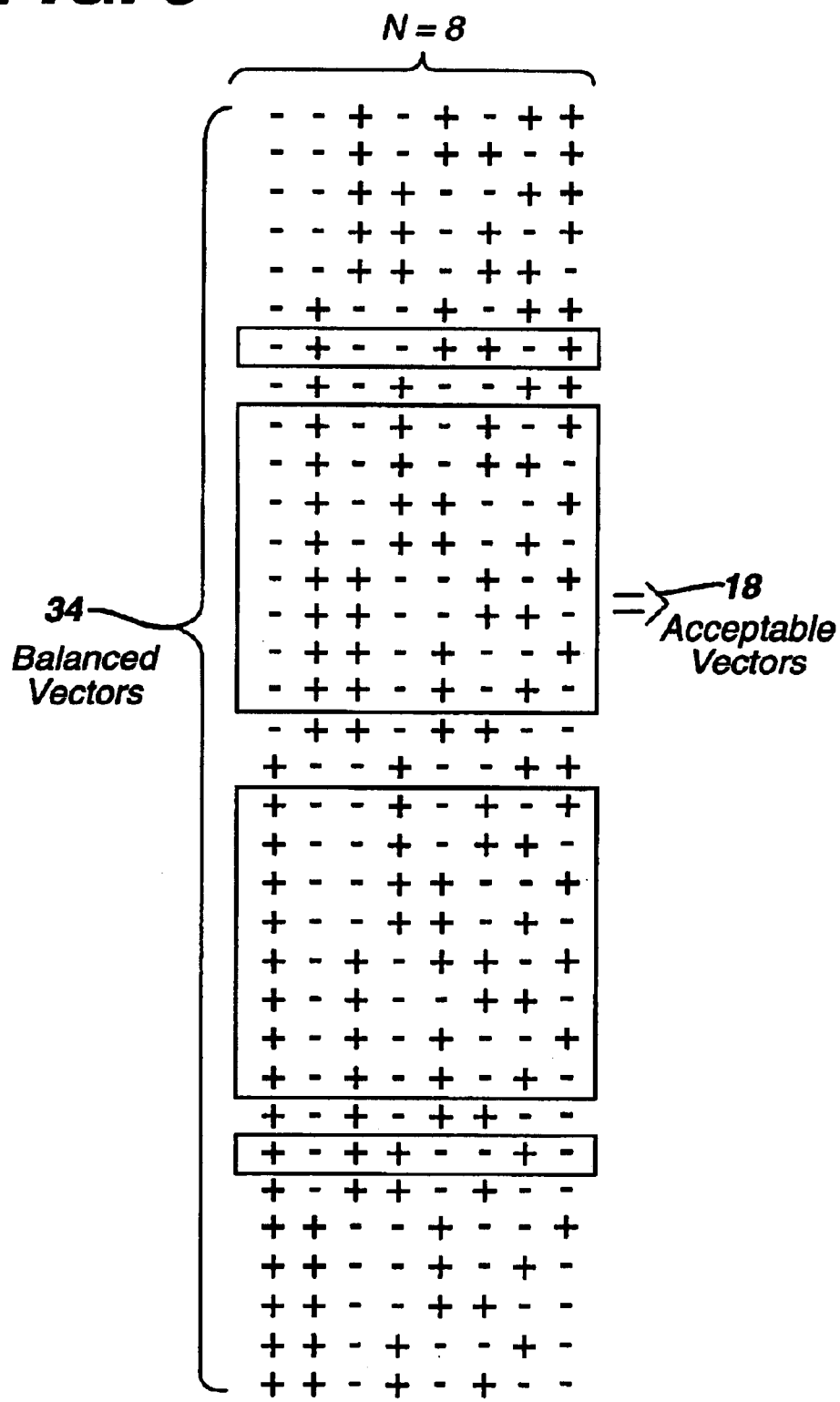
FIG. 3 is a list of the number of balanced vectors for N=8 with a maximum run of two.

Each of FIGS. 1, 2, and 3 shows a listing of balanced vectors with a maximum run of two like symbols for N=4, N=6, and N=8, respectively. While N can be of any length, it is here limited to N=8 for ease of illustration. FIG. 1 shows that the number of balanced vectors for N=4 with a maximum run of two is six (6). FIG. 2 shows that the number of balanced vectors for N=6 with a maximum run of two like symbols is fourteen (14). Similarly, FIG. 3 shows that the number of balanced vectors for N=8 with a maximum run of two like symbols is thirty-four (34).

The next step comprises eliminating vectors which begin or end in two identical symbols, avoiding runs of longer than two when vectors are concatenated. Acceptable vectors are shown in boxes in FIGS. 1–3. That is, for N=4 there are four (4) acceptable vectors, for N=6 there are eight (8) acceptable vectors, and for N=8, there are eighteen (18) acceptable vectors.

For simplicity of discussion, the four-dimensional instance (N=4) is illustrated below, with the two symbols denoted by "+" and "−":

$$S00=(+,-,+,-)$$
$$S11=(-,+,-,+)$$
$$S10=(+,-,-,+)$$
$$S01=(-,+,+,-).$$

The "SXX" labeling is deliberate, as explained below.

These four vectors have two properties that would provide the desired line coding:

(1) The minimum run of like symbols in any concatenation of vectors is two; and (2) If the baseband transmission of a "+" is realized with positive voltage V and transmission of a "−" is realized with a negative voltage −V, then any concatenation of symbols is dc-free.

With regard to coding gain, in the method of trellis coded modulation originally presented by Ungerboeck, "Channel coding with multilevel/phase signals", IEEE Trans. Inform. Theory, vol. IT-28, pp.55–67, 1982, Ungerboeck realized that improved coding gain can be achieved by mapping modulated signals onto convolutional code trellises in a sensible way. In particular, he suggested that signals which are most different from each other be mapped to diverging and merging branches of the trellis. For example, he partitioned an 8-PSK (phase shift keying) constellation into two 4-PSK constellations such that merging and diverging paths must be from the same 4-PSK constellation. Each point of the constellation was mapped to the output of a convolutional code according to his rule for merging and diverging branches. The result provided coding gain in a bandwidth efficient modulation. (Bandwidth efficient modulations transmit more than one pair of symbols per dimension available.)

Higher order modulations are undesirable in the effort to build a low cost transceiver. Fortunately, there are additional properties of the vectors which can be applied to trellis coding:

(3) Any given vector is different from any other vector in at least two places; and (4) There are two pairs of vectors which are different in all four positions.

Figure 4:
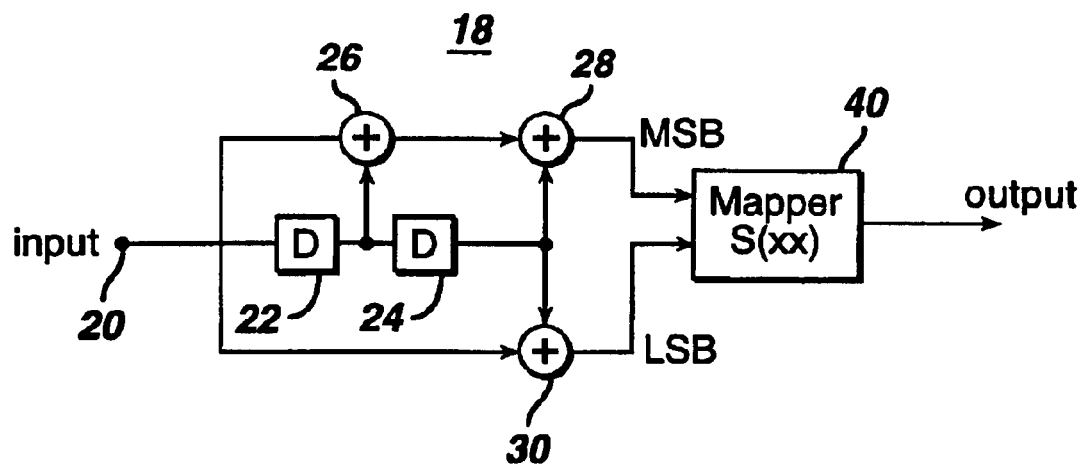
FIG. 4 is a block diagram of a rate ½ convolutional encoder.

A memory two, four state, rate ½ convolutional encoder 18 is shown in FIG. 4. Such encoder can be found for example in Viterbi, CDMA Principles of Spread Spectrum Communication, Addison Wesley, pp. 128–131, 1995. The encoder comprises an input 20 for receiving an input signal, a first memory delay 22, the output of which is routed to a second memory delay 24, and a modulo-2 first adder 26 which adds the input signal to a bit that is stored in first memory delay 22. Output signals from first adder 26 are added to output signals from second memory delay 24 by a second adder 28 to produce a most significant bit (MSB) output signal. A third adder 30 adds the input signal to the second memory delay 24 output signal, to produce a least significant bit (LSB).

Figure 5:
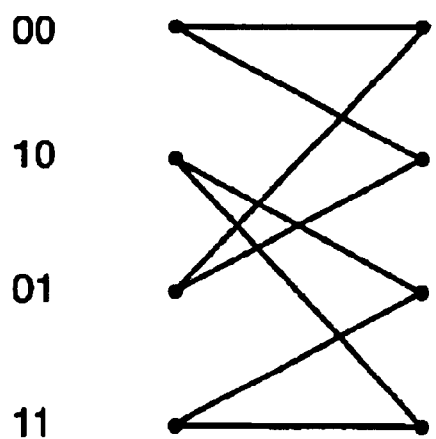
FIG. 5 is a trellis segment for the rate ½ convolutional encoder for N=4 vectors as shown in FIG. 1.

The trellis segment for the code is shown in FIG. 5. This simple code is a suitable choice for the four-dimensional vectors. The coded bit from the top branch is defined as the most significant bit (MSB), while the bottom branch is defined as the least significant bit (LSB). Each pair of output bits (MSB, LSB) selects one of the four vectors according to the labeling S(MSB, LSB) as defined previously.

The labeling is such that vectors associated with diverging branches are different in four places and vectors associated with merging branches are different in four places. Any other pair of branches is associated with a difference of at least two. The result is a free distance of 10.

Figure 6:
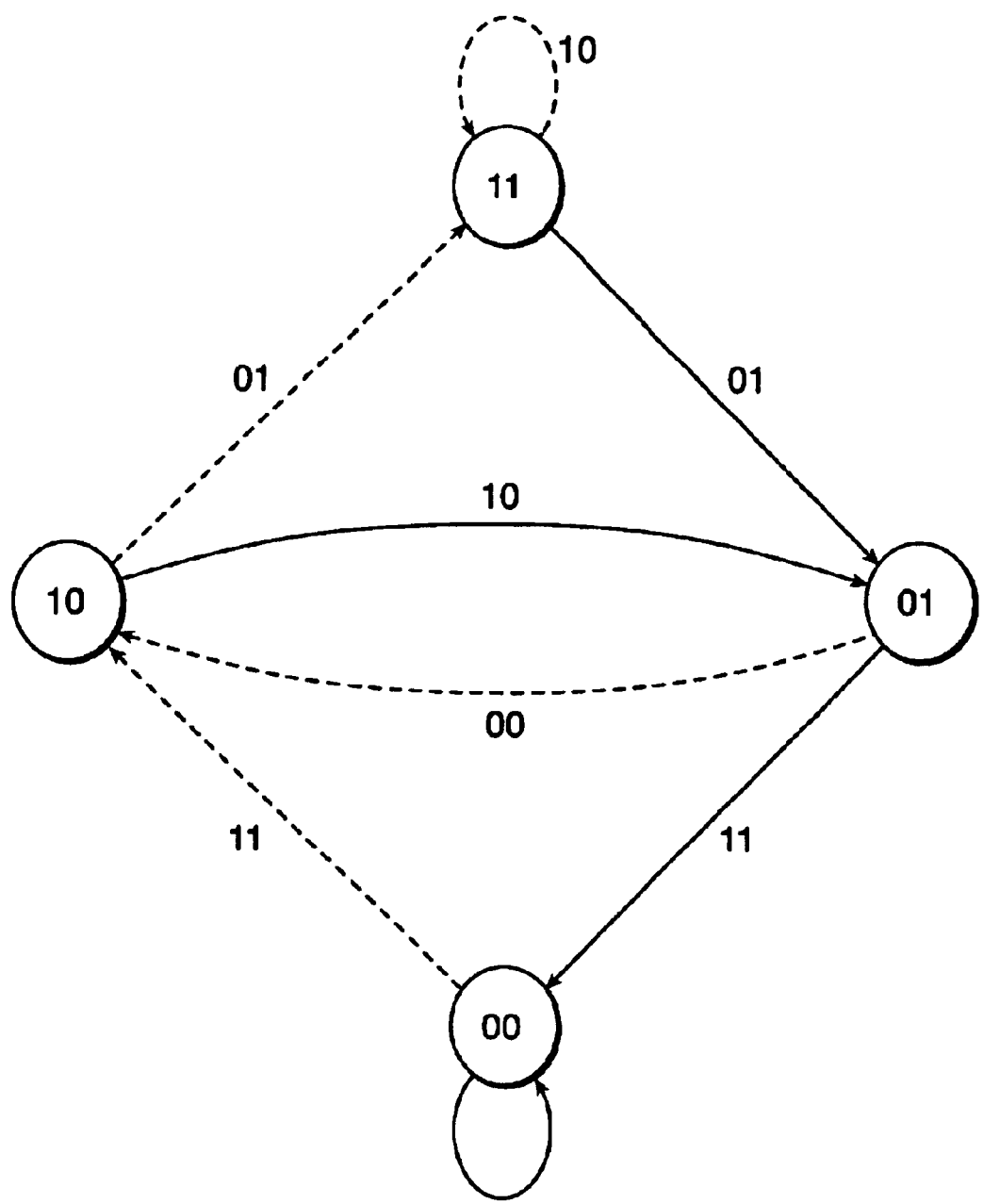
FIG. 6 is a state diagram of the ½ convolutional encoder shown in FIG. 4.

FIG. 6 is a state diagram for the convolutional encoder shown in FIG. 4. The state, shown in the circles, corresponds to the last two input signals stored in first memory delay 22 and second memory delay 24. The lines connecting the states represent input signals with a solid line being a "0" (zero) input signal and a dashed line being a "1" input signal. The numbers along the solid and dashed lines represent the output signal S(MSB, LSB) of the encoder. Thus, for example, starting in state 00, a "0" input signal keeps the encoder in state 00 and the encoder produces an S00 output signal. If, however, the input signal is a "1", then following the dashed line the state changes to state 10 and the encoder produces an S11 output signal. If, from this state, a "0" input signal is supplied, then following the solid line the state will transition to 01 with an output signal of S10. Alternatively, if a "1" input signal is supplied, then, following the dashed line, the state will transition to 11 with an S01 output signal, and so forth.

Referring again to FIG. 4, for each one bit input signal, the encoder will produce two output signals (MSB, LSB) according the value of the input signal and to the present state of the encoder. Accordingly, these output signals are mapped with a mapper 40 according to the code described above. The mapper may take a variety of forms, for example a look-up table embodied in a read only memory (ROM).

For example, when N=4, the output signals of the encoder S(MSB, LSB) are calculated as:

$$S00=(+,-,+,-)$$
$$S11=(-,+,-,+)$$
$$S10=(+,-,-,+)$$
$$S01=(-,+,+,-).$$

For a simple example, starting in state 00, a "0" input signal results in an S(00) output signal which is mapped, in voltage terms, to +,−,+, −. Thereafter, if a "1" input signal is provided, the state transitions to "10", resulting in an S(11) output signal, which is mapped to −,+,−,+. When these output signals are concatenated, the result is "+,−,+, −, −,+,−,+". Thus, with this coding scheme, there is an equal number of pluses and minuses for a dc free baseband and there is never a run greater than two on any like symbol.

A system with comparable performance to the one disclosed above uses rate ½ convolutional coding with a free distance of 10 followed by Manchester coding for similar line coding. A rate ½ code with a free distance of 10 requires 64 states versus 4 states for the disclosed method. Since 4 channel symbols per bit are transmitted with the disclosed method as opposed to 2 in the Manchester/convolutional system the complexity reduction of the new coding system is roughly 8 times.

Figure 7:
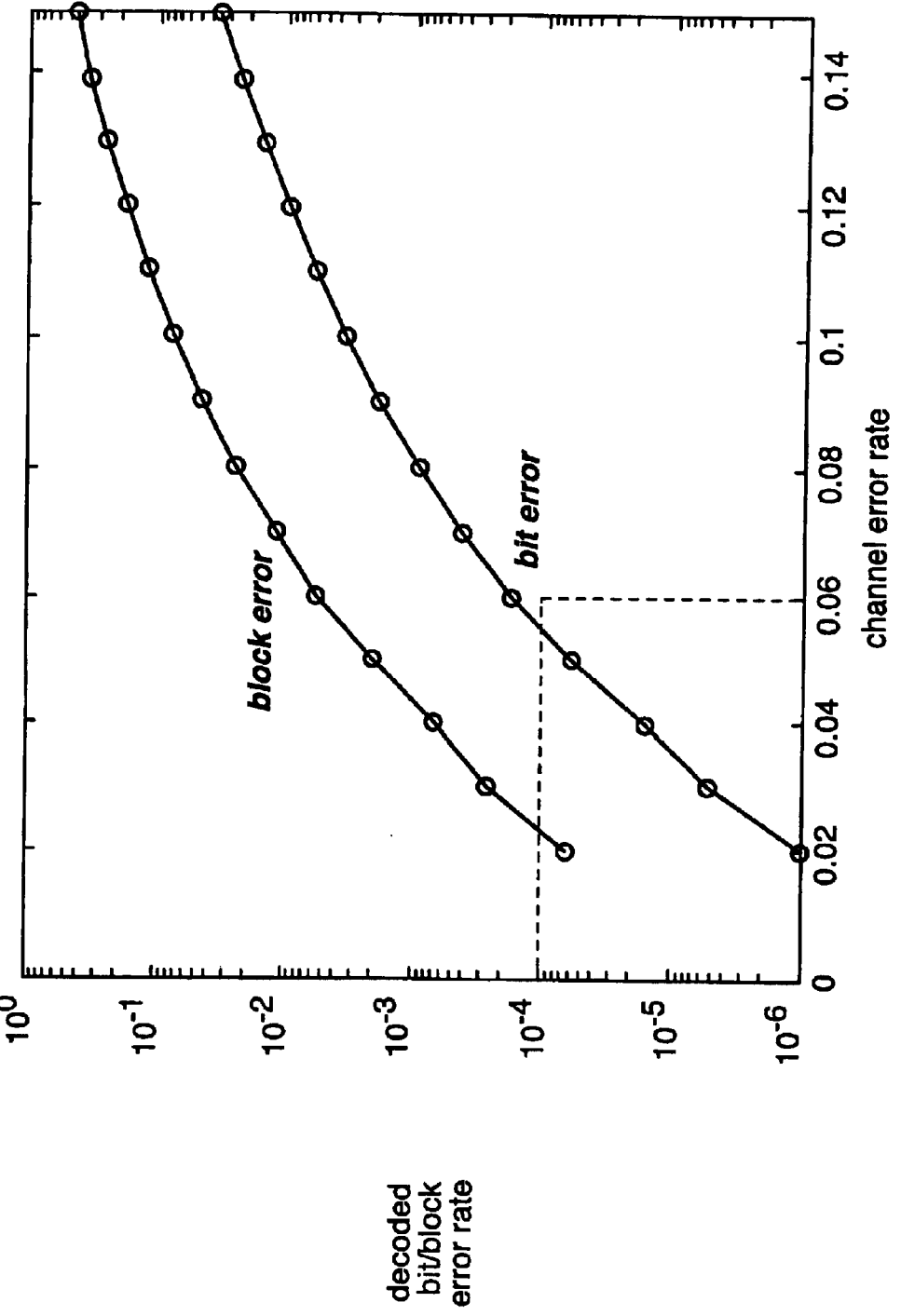
FIG. 7 is a graph of performance results using hard decision Viterbi decoding over a range of channel error rates for the trellis segment shown in FIG. 5.

Decoding can be performed with a soft or hard decision Viterbi algorithm. Simulated performance results using hard decision Viterbi decoding over a range of channel error rates is shown in FIG. 7. The x-axis shows the input channel rate error and the y-axis shows the decoded output bit error and block error. The block error is based on a twenty bit block. For example, with an input channel error probability of 0.06, the decoded bit error is only $10^{-4}$ with the present invention.

A wide variety of codes can be created by employing the design philosophy of this disclosure. For example, a code with an overall rate of ⅓ was constructed. This code uses an 8 state rate-⅔ convolutional code and achieves a free distance of 8. This particular code is of interest for systems where higher spectral efficiency is necessary.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A dc-free line code, comprising:

a list of N-dimensional vectors comprising an alphabet of two symbols further comprising at least one positive symbol and at least one negative symbol; said list of N-dimensional vectors further adapted to generate an output signal having an equal member of said positive symbols and said negative symbols;

wherein said positive symbol and said negative symbol is further configured to be realized by a positive voltage and a negative voltage equal in magnitude to said positive voltage;

wherein each of said N-dimensional vector in said list has a maximum run of two consecutive identical symbols; the N-dimensional vectors being configured not to begin or end with said two identical symbols;

encoding means for encoding input bits onto a convolutional trellis encoder comprising a plurality of braches wherein ones of said N-dimensional vectors associated with said branches having said two symbols are different in N-places of the N-dimensional vectors, said convolutional trellis encoder adapted to provide two respective output bits of said output signal in response to each respective one of said input bits and the present state of the encoding means;

wherein said said encoding means comprises a memory two, four state, rate ½ convolutional encoder; and a mapper for mapping said output signal from said encoder to one of said N-dimensional vectors in said list.

2. The dc-free line code of claim 1, wherein said two output bits comprise a least significant bit (LSB) and a most significant bit (MSB).

3. The dc-free line code of claim 1, wherein said mapper comprises a look-up table.

4. A method of modulating an input signal with a dc free line code, comprising the steps of:

listing N-dimensional vectors comprising an alphabet of two symbols in a list comprising at least one positive symbol and at least one negative symbol; said list of N-dimensional vectors further adapted to generate an output signal having an equal number of said positive symbols and said negative symbols;

wherein said positive symbol and said negative symbol is further configured to be realized by a positive voltage and a negative voltage equal in magnitude to said positive voltage;

wherein each of said N-dimensional vector in said list has a maximum run of two consecutive identical symbols; the N-dimensional vector being configured not to begin or end with said two identical symbols;

encoding input bits onto a convolutional trellis encoder comprising a plurality of braches wherein ones of said N-dimensional vectors associated with said branches having said two symbols are different in N-places of the N-dimensional vectors, wherein two respective output bits of said output signal are provided in response to each respective one of said input bits and the present state of the convolutional encoder; and mapping said output signal from said encoder to one of said N-dimensional vectors in said list.

5. The method of claim 4 wherein said mapping of said output signal comprises mapping with a look-up table.

* * * * *